United States Patent [19]
Jacquelin

[11] 3,977,903
[45] Aug. 31, 1976

[54] FORCED-FLOW ELECTROCHEMICAL BATTERY

[75] Inventor: Jean Jacquelin, Marolles en Hurepoix, France

[73] Assignee: Compagnie Generale d'Electricite, Paris Cedex, France

[22] Filed: Dec. 6, 1974

[21] Appl. No.: 530,098

[30] Foreign Application Priority Data
Dec. 6, 1973  France .............................. 73.43591

[52] U.S. Cl. ............................. 136/86 A; 136/86 R
[51] Int. Cl.² ..................... H01M 8/04; H01M 8/24
[58] Field of Search ................... 136/86 A, 86, 86 R

[56] References Cited
UNITED STATES PATENTS
3,849,202   11/1974   Pompon ........................... 136/86 A Primary Examiner—John H. Mack
Assistant Examiner—H. A. Feeley
Attorney, Agent, or Firm—Sughrue, Rothwell, Mion, Zinn and Macpeak

[57] ABSTRACT

The invention comprises the grouping of a battery into modules fed in series with a potassium hydroxide solution containing zinc in suspension. It further comprises the grouping of the modules into an even number of assemblies in which the modules are connected in series, the assemblies having the same number of modules and being interconnected in parallel, so that more particularly, the potential of the solution conveyed from a storage tank is equal to the potential of the solution which is made to flow back into the said tank after having crossed through the said modules.

5 Claims, 5 Drawing Figures

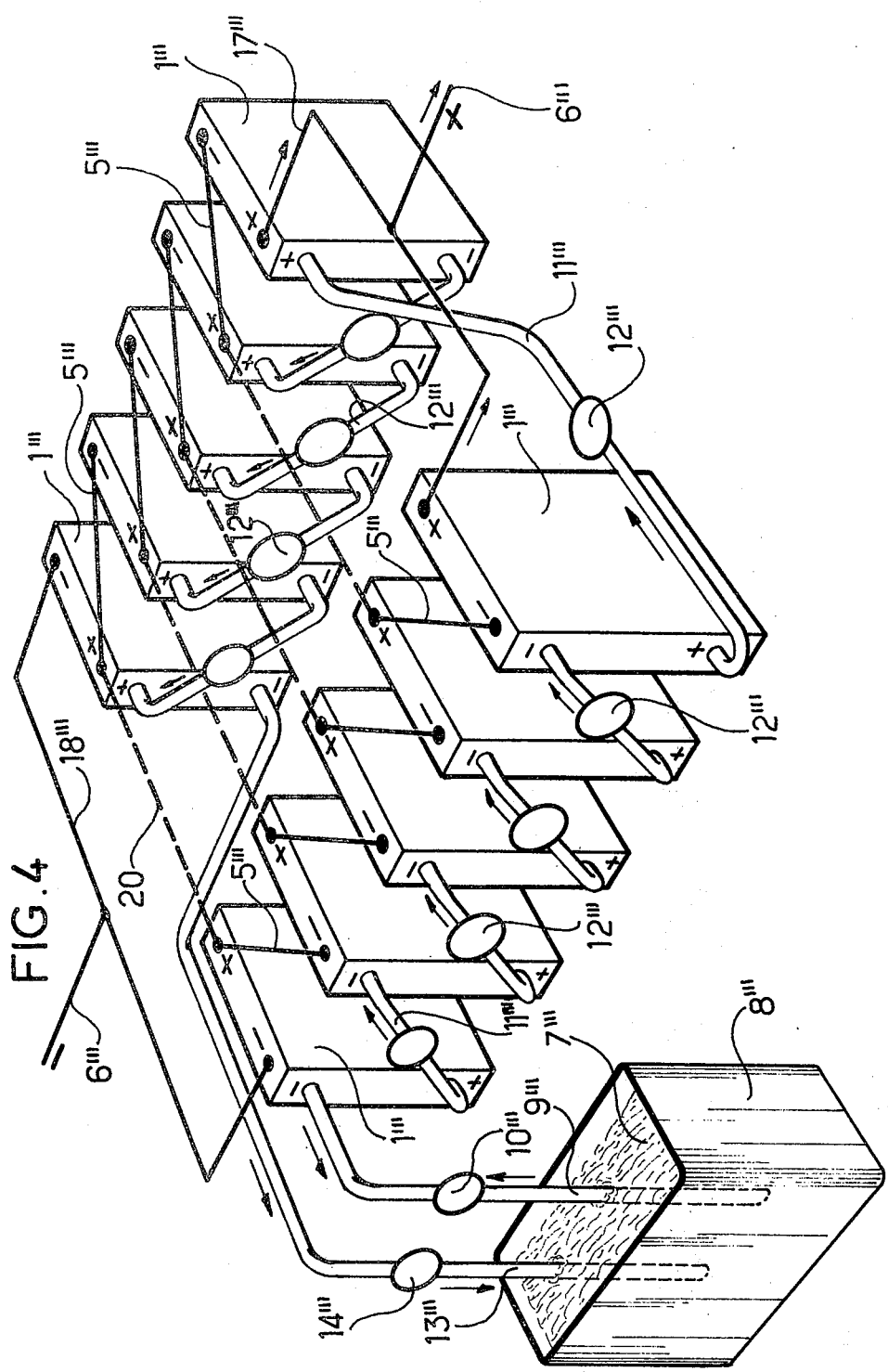

FORCED-FLOW ELECTROCHEMICAL BATTERY

BACKGROUND OF THE INVENTION

1. Field of the Invention

The present invention is in the field of forced-flow electrochemical batteries.

2. Prior Art

Forced-flow electrochemical batteries are already well known in the art and are, at present, the object of numerous research with a view to equipping non-polluting vehicles.

Among these batteries, air-zinc systems offer considerable advantages for such applications.

An elementary cell of such a battery comprises a catalytic part or positive electrode, on which oxygen from the air is reduced, and an alkaline solution containing zinc powder in suspension, conveyed by means of pumps, which flow over a negative electrode. The oxidation of the zinc and the reduction of the oxygen generate an electric current.

To constitute a battery, it is clearly necessary to couple such elementary cells together both electrically and hydraulically.

Though it is possible to consider feeding the solution to the cells in parallel, it is however observed that if the cells are electrically coupled together in series, leakage currents occur, which are not only detrimental to the electrochemical efficiency, but may also cause gas generation by electrolytic decomposition of the solution, metal deposits, or corrosion.

These leakage currents exist because of electrical potential gradients between individual cells. To substantially reduce the gradient, it is therefore necessary to feed the alkaline solution in series to the cells, in the case where the same cells required to be connected electrically in series.

In this way, sets of cells, hereafter called modules, each comprising a limited number of cells are produced and it is, of course, possible to couple such modulus together with a view to forming a battery having predetermined electrical characteristics and ratings.

Such a coupling method may, in certain cases, have substantial disadvantages, as will be clearly explained in the descriptive part of the present invention.

SUMMARY OF THE INVENTION

The objects of this invention is therefore the construction of an electrochemical battery of the type comprising several cells fed in series by an electrolytic solution comprising an active material in suspension and more particularly zinc powder, the said solution being conveyed by forced flow in the said cells from a storage tank and made to flow back into the said tank after having passed through the last cell. The cells are grouped together in modules and are electrically connected in series within the said modules (m), said modules each giving a voltage U and a current I, themselves being connected electrically in series to constitute a battery. They are fed in series by the said solution the battery is suitable for supplying an electromotive force mU and a rated current I. The said modules themselves are grouped into $p$ assemblies and are electrically connected in series in each assembly and are characterized in that the number $p$ of assemblies is an even number, the assemblies each comprising the same number $m$ of modules each capable of supplying an electromotive force U and a rated current I/$p$. The assemblies are connected together in parallel, in such a way that the potential of the solution conveyed from tank towards the first cell of the battery is equal to the potential of the solution leaving the last cell of the said battery before being made to flow back into the said tank.

BRIEF DESCRIPTION OF THE DRAWINGS

Other characteristics and advantages of the invention become apparent from the following description, with reference to the accompanying drawings and diagrams in which:

FIG. 4 is a second embodiment of a battery according to the invention.

DETAILED DESCRIPTION OF THE PREFERRED EMBODIMENT

Figure 1:
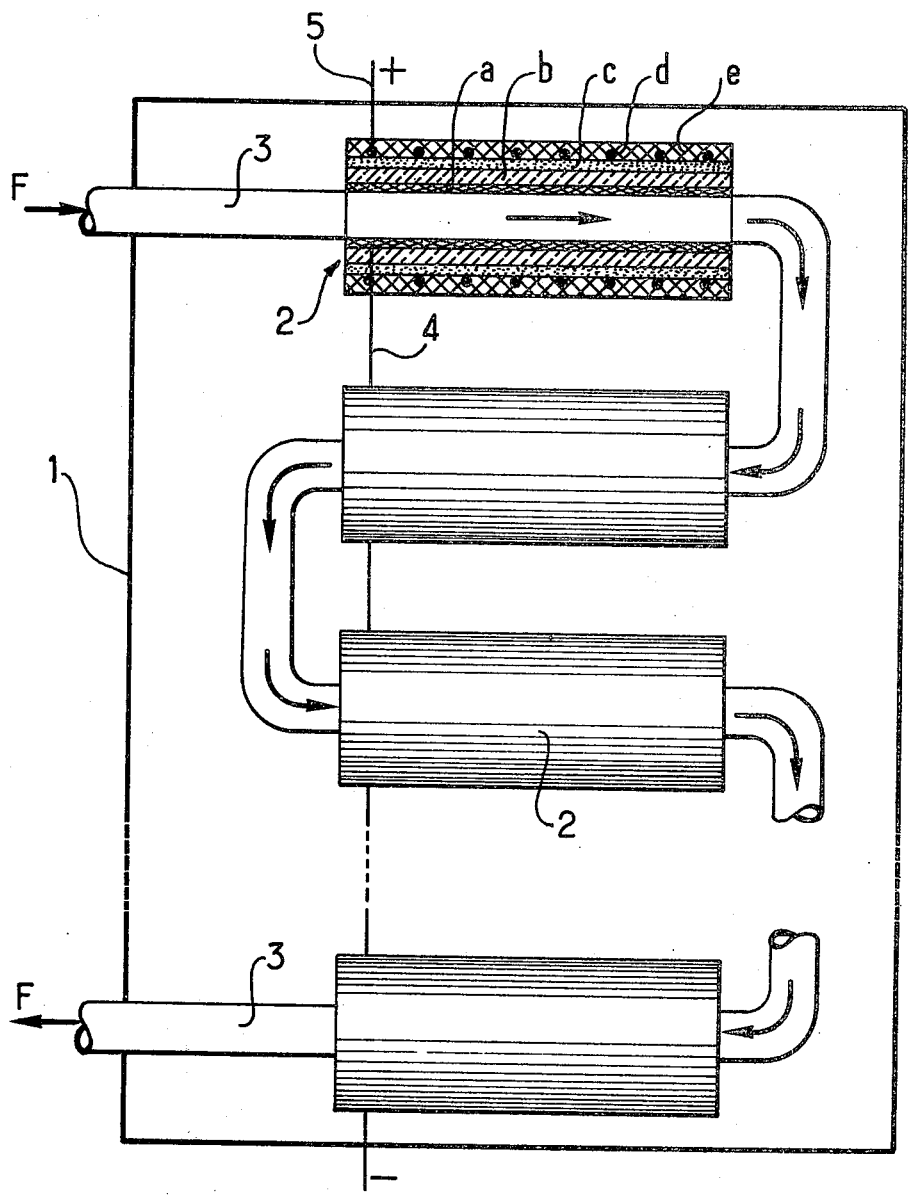
FIG. 1 shows the structure of a module implemented in a battery according to the invention.

FIG. 1 is a module 1 constituted by a certain number $n$ of cells 2 substantially identical to one another, each providing an electromotive force $u$ and fed in series by a potassium hydroxyde solution containing zinc powder in suspension, such a feed being effected through ducts 3 and being materially shown by arrows F.

Such cells are, for example of the type described by the applicant in his French Application No. 71 45 734 of the 20th Dec. 1971, as well as in the application for additions No. 72 228 61 of 26th June, 1972 and No. 73 147 65 of the 24th Apr. 1973, for a "Forced flow electrochemical battery".

Each of the cells 2 comprises a negative collector grid or electrode $a$, a porous separator $b$, a porous active catalytic layer $c$, in contact with a positive collector grid $d$, the catalytic layer and positive collector comprising the positive electrode, the entire structure surrounded by a porous water-repellent layer $e$. Such cells are therefore traversed throughout their entire length by a potassium hydroxyde solution containing zinc powder as shown. The oxidation of the zinc and the consumption of oxygen from the outside air generates an electromotive force between the grids $a$ and $d$. It must be understood that the cells shown are electrically connected together in series by means of conductors 4, the electromotive force generated by such a module being collected at the terminals of the external connections 5.

It is mentioned for reference, that in application No. 74 12 152 of 5th Apr. 1974, for a "Method and device for connecting cells of forced flow electrochemical batteries", the applicant has set forth the means for electrically connecting cells in series while avoiding detrimental electrical interference phenomena.

It will be observed, however, that the maximum number of cells 2 in a module is limited by pressure drop engendered in the said cells by the flow of solution.

Indeed, if the pressure of the solution at the input is designated as $p\,o$ and if the pressure drop in a cell is designated as $\Delta p$, it will be seen that in the last cell (in this instance, the cell at the bottom of FIG. 1), the pressure is $p\,o - n\,\Delta p$, $n$ being the number of cells of the module. Now, it is well known that it is necessary for that pressure to remain between certain limits in order that a porous air electrode might operate correctly.

The value of $n$ is therefore limited by such a pressure restriction.

Nevertheless, it is mentioned, for reference, that in French patent application No. 73 44 188 of 11th Dec., 1973, for a "Method and device for feeding the elements of a forced flow electrochemical battery", the Application has set forth causes and effects of that difficulty and has described a method and device for the flow of the electrolyte making it possible to connect hydraulically in series a theoretically unlimited number of modules, yet maintaining the air electrodes of the cells in optimum pressure conditions, while retaining the advantages of the previously mentioned method and device for electrically connecting in series.

To great advantage, the flow of liquid enters through the upper cell and leaves through the lower cell, as is shown in the figure. If the total height of the module is designated as h and the density of the solution is designated as $p$, the difference in the static pressure between the top and the bottom is equal to $ph$. The solution pressure drop being, as previously indicated, $n\Delta p$, the resulting difference in pressure is $n\Delta p - ph$. Thus, the pressure drop $n\Delta p$ is partly compensated by the difference in static pressure $ph$, this being an advantage, for the number $n$ of cells per module may thus be somewhat greater than if the reverse direction of flow had been chosen.

Figure 2:
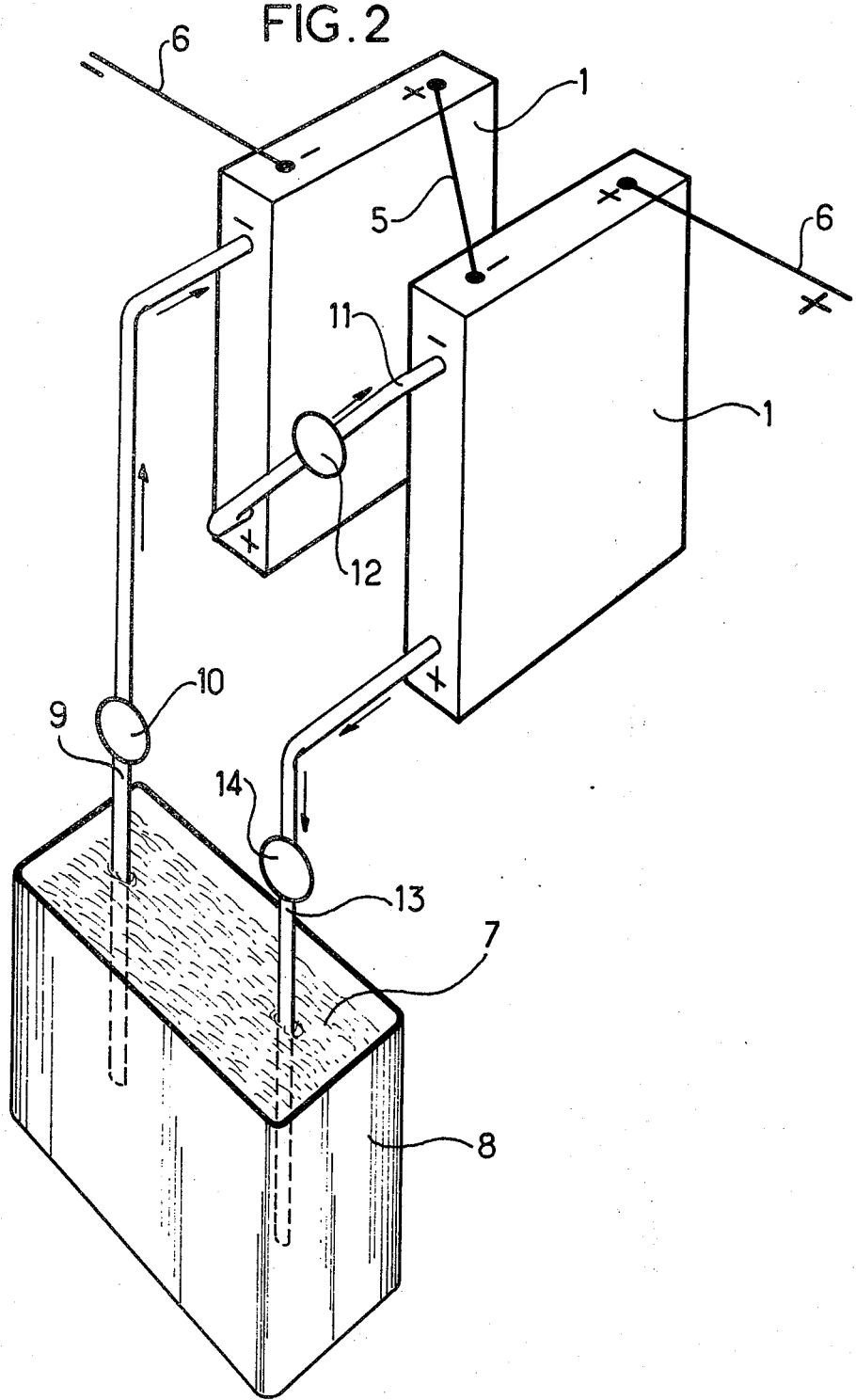
FIG. 2 is a prior art battery.

FIG. 2 shows a known method of connecting two modules 1, each sending out an electromotive force, $U = nu$, and a rated current I. These modules are electrically connected in series through their output connections 5, so that at the terminals of the end connections 6, a voltage 2U and a rated current I is collected.

From the hydraulic point of view, such modules are fed with a potassium hydroxyde solution 7 comprising zinc powder in suspension and enclosed in a tank 8 by means of an input pipe 9 and a pump 10 suitable for compensating the difference in static pressure $ph$. An intermediate pipe 11 ensures the conveying of the solution from one module towards the next, a pump 12 installed on that pipe being capable of compensating the pressure drop $n\Delta p$ in the module arranged upstream.

Finally, after having passed through the modules, the solution is recycled into the tank 8 by means of the pipe 13 and of the pump 14, the latter being capable of compensating the pressure drop $n\Delta p - ph$. Such an arrangement has the following major disadvantage:

The solution 7 from the tank 8 in the vicinity of the end of the pipe 9 is at a zero potential, whereas the solution in the vicinity of the end of the pipe 13 is brought substantially to the potential 2U, therefore to a potential close to that of the battery.

Such a difference in potential within the solution generates intense leakage currents, appreciable corrosion, metallic deposits and can even give rise to explosions caused by the gases resulting from the decomposing of the electrolyte.

To counteract this effect, it has been proposed in the art to install on the pipe 13 and within the tank 8, a rotating plate device suitable for dividing up into fine droplets the recycled solution and hence reduce its potential at the outlet.

Nevertheless, implementation of such a device raises technological difficulties resulting from the agressiveness of the solution on the one hand, and from electrical insulation difficulties in an electrical medium on the other hand.

Figure 3A:
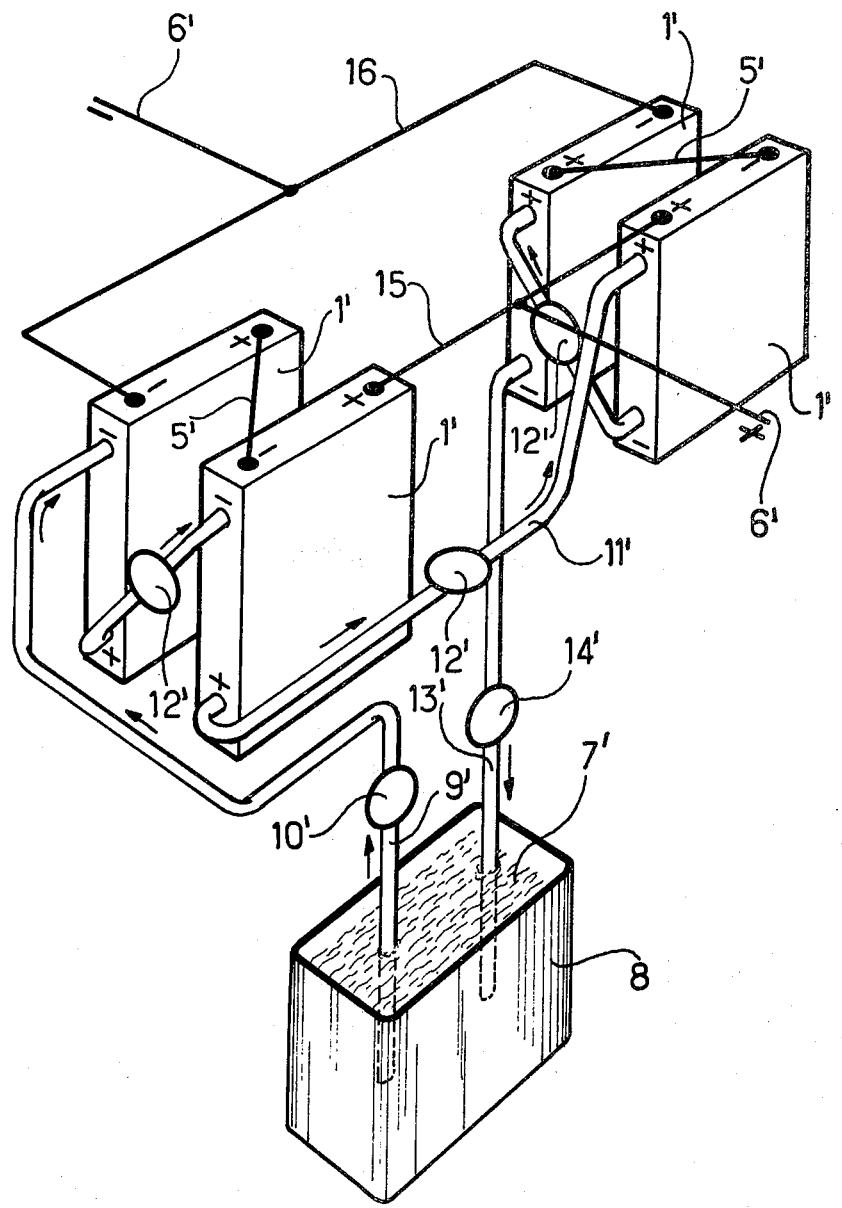
FIG. 3A is an example of a preferred embodiment of a battery according to the invention.

FIG. 3A illustrates an example of embodiment of a battery accoding to the invention, making it possible to overcome the previously mentioned disadvantages.

Four modules 1', which are substantially identical, each producing an electromotive force U but a rated current of only I/2 are implemented. These modules are electrically connected in series two by two as shown by means of their output connections 5'.

Moreover, the two assemblies of two modules connected in series are connected together in parallel by means of the conductors 15 and 16 as shown.

In this way, the solution 7 leading out through the pipe 13' of the last module 1' is brought to the same potential as the solution passing through the pipe 9' to feed the modules 1', the said potential being, moreover, substantially zero. It will be seen therefore, that within the tank 8, the whole of the solution 7 is at the same potential, thus making it possible to avoid the previously mentioned disadvantages.

Lastly, it will be such that at the terminals 6' of the cell, an electromotive force 2U and a rated current I exist, hence the same electrical characteristics as in the prior art battery shown in FIG. 2, will be collected.

From the hydraulic point of view, the supply of solution 7 to the modules 1' is effected in series, by means of the pipes 9', 11', 13', cooperating with the pumps 10', 12', and 14', the pump 10' compensating the difference in static pressure $ph$, the pumps 12' compensating the losses of charge $n\Delta p$ in the modules and the pump 14' compensating the difference $n\Delta p - ph$.

It is quite evident that the modules 1' as implemented have a smaller volume than the volume of the modules 1 described in FIG. 2, their rated intensity only half that of the said modules 1.

It will be described, however, that the electrolyte enters the battery through the cell having the most negative potential in the most negative module of the first assembly, through the pipe 9'. After having passed through that first assembly, it leaves through the cell having the most positive potential in the most positive module, to enter, subsequently, the second assembly through the cell having the most positive potential in the most positive module, through the pipe 11'. After having passed through that second assembly, it leaves through the cell having the most negative potential in the most negative module and is made to flow back into the tank 8 through the pipe 13'.

In this way, the potential of the electrolyte has the following approximate successive values:

0 in the pipe 9';
U in the intermediate pipe between the two modules of the first assembly;
2U in the pipe 11';
U in the intermediate pipe 11' between the two modules of the second assembly;
0 in the pipe 13'.

In other words, the potential of the electrolyte which is conveyed from the tank 8 at a zero potential increases by a certain value in the first assembly of modules, to decrease, subsequently, substantially by the same value in the second assembly, and, consequently, to be made to flow back into the said tank at a potential which is again zero.

Figure 3B:
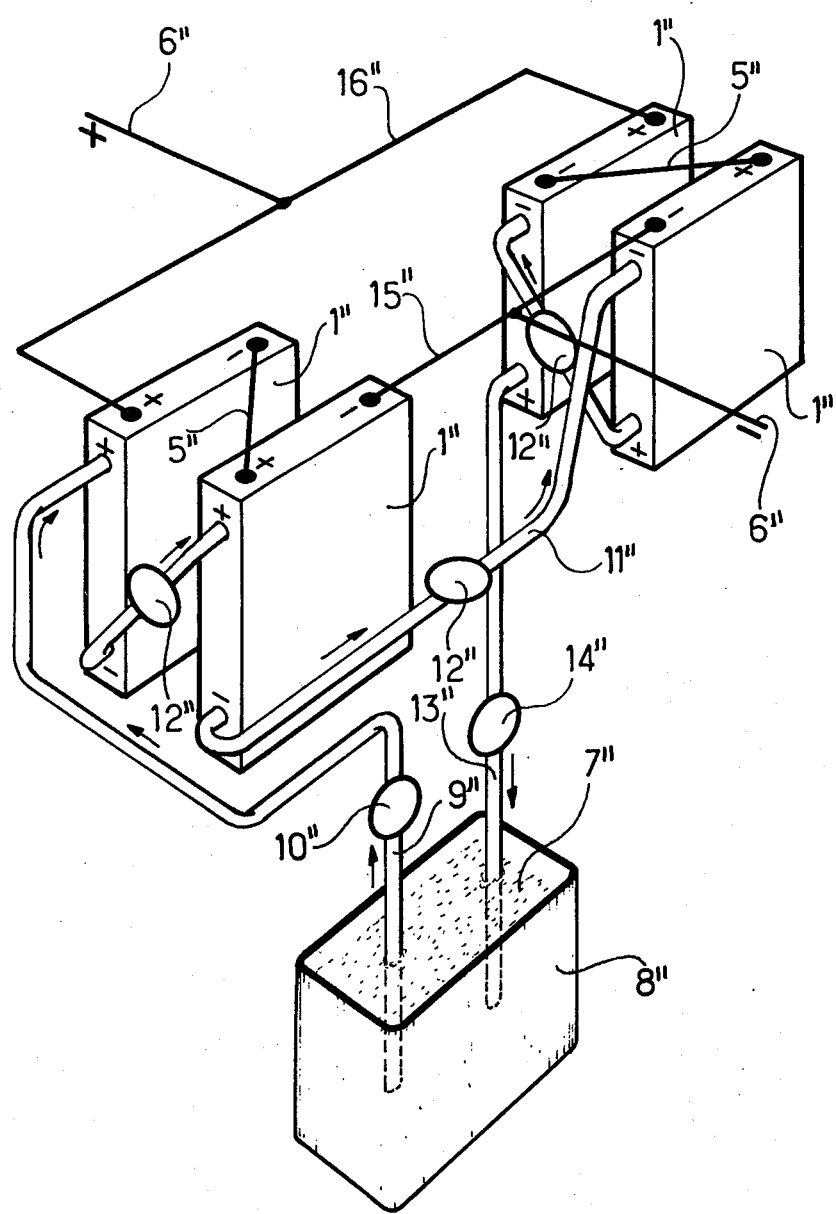
FIG. 3B is a variation of the first preferred embodiment according to the invention.

FIG. 3B shows a variant of the preceding device. The various parts such as modules, pumps and the like are the same as in the preceding case, using the same reference numerals which have, however, the index "second" assigned to them.

In this embodiment, the electrolyte enters the battery through the cell having the most positive potential in the most positive module of the first assembly, through the pipe 9″. After having passed through that first assembly, it leaves through the cell having the most negative potential in the most negative module, to enter, subsequently, the second assembly through the cell having the most negative potential in the most negative module through the pipe 11″. After having crossed through that second assembly, it leaves through the cell having the most positive module and is made to flow back to the tank 8″ through the pipe 13″.

In this way, potential of the electrolyte has the following approximate successive values:
0 in the pipe 9″;
U in the intermediate pipe between the two modules of a first assembly;
2U in the pipe 11″;
U in the intermediate pipe 11″ between the two modules of the second assembly;
0 in the pipe 13″.

As in the preceding case, the potential of the electrolyte which is conveyed from the tank 8″ at zero potential increases in absolute value by a certain value in the first assembly of modules, to decrease, subsequently, substantially by the same value in the second assembly, and consequently, to be made to flow back into the said tank at a potential which is again zero.

FIG. 4 illustrates another example of embodiment of a battery according to the invention in which two assemblies of five modules 1‴ are implemented, each producing an electromotive force U and a rated current I/2. As in the preceding case, such modules are fed hydraulically in series by the pipes 9‴, 11‴, 13‴ together with the pumps 10‴, 12‴, 14‴. The two assemblies of modules thus connected in series to the electrical conductors 5‴ are connected in parallel by means of the electrical conductors 17‴ and 18‴, linking the positive and negative outputs 5‴ respectively as shown in the figure.

In this way, an electromotive force 5U and a rated current I are collected at the end terminals 5‴ of the battery.

It will be observed that the electrolyte 7‴ enters battery through the cell of the first assembly whose potential is the most negative and leaves the second assembly through the cell whose potential is also the most negative, so as to be made to flow back into the tank 8‴.

This is therefore the type of feed system such as described in FIG. 3A.

It is, of course, possible to consider the case of the feed system described with reference to FIG. 3B without its being forasmuch necessary to illustrate it in this other example of an embodiment of a battery according to the invention.

It is quite evident that it is possible to produce, in this way, batteries comprising an even number $p$ of assemblies each consisting of a random and unlimited number $m$ of modules.

On the other hand, it is clear that it will not be possible to produce batteries comprising an odd number of assemblies, since the potential of the electrolyte will suddenly change in the pipe connecting the last module of an assembly of even order to the first module of an assembly of odd order.

In practice, there is an advantage in choosing, a number of assemblies equal to 2, with a view to limiting the number of stages of pump rotors, the said rotors being in an assembly which is, to great advantage, fixed on a common drive shaft.

Moreover, it should be contingently possible to add auxiliary electrical conductors such as are shown in the discontinuous lines at 20 in FIG. 4, interconnecting successively the electrical conductor 5‴ between the first and second module of one assembly to the electrical conductor 5‴ between the first and second module of the second assembly having at the same time the electrical conductor 5‴ between the second and third module of one assembly attached to the electrical conductor 5‴ between the second and third module of the second assembly and so on.

In this way, the variation of performance in individual modules and the functioning of the battery is reduced.

The invention therefore makes it possible to produce a reliable forced flow battery in which the potential of the electrolyte conveyed from the tank is equal to the potential of the electrolyte made to flow back into the said tank, this making it possible to avoid the disadvantages and dangers previously mentioned, without requiring any extra electromechanical equipment.

The invention is not limited to the embodiments described and illustrated, which have been given by way of an example. More particularly, without going beyond the scope of the invention, details may be modified, certain arrangements may be changed or certain means may be replaced by equivalent means.

I claim:

1. In an electrochemical battery of the type comprising a plurality of cells fed in a series by an electrolytic solution comprising, an active material including zinc powder, in suspension, a storage tank, said solution being conveyed by forced flow in said cells from said storage tank to a first cell of said plurality of cells and made to flow back into said tank after having passed through a last cell of said plurality of cells, cells being grouped together in modules and electrically connected in series within said modules, said modules themselves being fed in series by the solution, the battery being capable of producing an electromotive force mU and a rated current I, said modules themselves being grouped into $p$ assemblies and electrically connected in series in each assembly, the improvement characterized in that the number $p$ of assemblies is an even number, said assemblies each comprising the the same number $m$ of modules, each suitable for producing an electromotive force U and a rated current I/$p$, said assemblies being connected together in parallel, so that the potential across the electrolytic solution conveyed from the storage tank towards the first cell of the battery is equal to the potential across the solution leaving the last cell of said battery before being made to flow back into said storage tank.

2. A battery according to claim 1, characterized in that the said number $p$ is equal to 2.

3. A battery according to claim 1, characterized in that the electrolytic solution enters a first assembly comprising an odd number of modules through the cell which, in the module whose potential is the most negative, itself has the most negative potential and leaves the last of the said odd number of modules in said first assembly through the cell which in the module whose potential is the most positive, itself has the most negative potential, and then enters a second assembly comprising an odd number of modules through the cell which, in the module whose potential is the most positive, itself has the most positive potential and leaves the last of said odd number of modules in said second assembly through the cell which, in the module whose potential is the most negative, itself has the most negative potential.

4. A battery according to claim 1, characterized in that the electrolytic solution enters a first assembly comprising an odd number of modules through the cell which, in the module whose potential is the most positive, itself has the most positive potential and leaves the last of the said odd number of modules in said first assembly through the cell which in the module whose potential is the most negative, itself has the most negative potential, and then enters a second assembly coman odd number of modules through the cell which, in the module whose potential is the most negative, itself has the most negative potential and leaves the last of said odd number of modules in said second assembly through the cell which, in the module whose potential is the most positive, itself has the most positive potential.

5. A battery according to claim 1, characterized in that in each assembly, a conductor is electrically connected in series to the module whose sequential number is $i$ to the module whose sequential number is $i + 1$ and is itself electrically connected to the conductors joining, in each of the other assemblies, the module whose sequential number is $i$ to the module whose sequential number is $i + 1$.

* * * * *